United States Patent
Gupta

(10) Patent No.: US 8,645,814 B2
(45) Date of Patent: Feb. 4, 2014

(54) SYSTEM AND METHOD FOR DISPLAYING STATUS OF ELECTRONIC MESSAGES

(75) Inventor: Sunil Kumar Gupta, Bangalore (IN)

(73) Assignee: Yahoo! Inc., Sunnyvale, CA (US)

(*) Notice: Subject to any disclaimer, the term of this patent is extended or adjusted under 35 U.S.C. 154(b) by 398 days.

(21) Appl. No.: 12/684,276

(22) Filed: Jan. 8, 2010

(65) Prior Publication Data
US 2011/0173522 A1 Jul. 14, 2011

(51) Int. Cl.
*G06F 17/00* (2006.01)

(52) U.S. Cl.
USPC .................. 715/207; 715/205; 715/273

(58) Field of Classification Search
USPC .................. 715/200, 205, 207, 273
See application file for complete search history.

(56) References Cited

U.S. PATENT DOCUMENTS

| | | | |
|---|---|---|---|
| 7,774,411 B2* | 8/2010 | LeMay et al. | 709/206 |
| 7,831,267 B2* | 11/2010 | Klassen et al. | 455/466 |
| 7,908,647 B1* | 3/2011 | Polis et al. | 726/5 |
| 2003/0101343 A1* | 5/2003 | Eaton et al. | 713/170 |
| 2007/0050510 A1* | 3/2007 | Jiang | 709/227 |
| 2007/0250583 A1* | 10/2007 | Hardy et al. | 709/206 |
| 2009/0176521 A1* | 7/2009 | Klassen et al. | 455/466 |
| 2009/0248803 A1* | 10/2009 | Akaboshi et al. | 709/204 |
| 2010/0010968 A1* | 1/2010 | Redlich et al. | 707/3 |
| 2010/0250682 A1* | 9/2010 | Goldberg et al. | 709/206 |

* cited by examiner

*Primary Examiner* — Gregory J Vaughn
(74) *Attorney, Agent, or Firm* — James J. DeCarlo; Greenberg Traurig, LLP

(57) ABSTRACT

Methods, systems and computer program products are displaying one or more electronic messages on a user interface. In one method, the method records timestamps of one or more activities of a user in a first user session. Subsequently, the method compares the timestamp of an initialization of a second user session, with the recorded timestamp of the one or more events such as a last logout timestamp and/or a last activity timestamp of the first user session. Further, the method may mark one or more new electronic messages based on the comparison of the timestamps. The method may then display the status of the marked one or more new electronic messages on a user interface based on the markings applied on the one or more new electronics messages received.

19 Claims, 4 Drawing Sheets

FIG. 3B

| XYZ MAIL | | | | HI, ABC ▽ | SIGN OUT |
|---|---|---|---|---|---|
| MAIL | CONTACTS | CALENDAR | NOTEPAD | | |

CHECK MAIL ▽ | COMPOSE ▽ | SEARCH [ ] WEB SEARCH

☐ FREE PHONES | NEW MAILS

FOLDERS
☐ INBOX(317)
☐ DRAFTS
☐ SENT
☐ SPAM(161) [EMPTY]
☐ TRASH [EMPTY]

VIEW: ALL | UNREAD | FLAGGED

| | DELETE | SPAM | MARK ▽ | MOVE... ▽ | | |
|---|---|---|---|---|---|---|
| ☐ | 🚩 | FROM | 📎 SUBJECT | DATE | SIZE |
| ☐ | • | CAREER | LOOKING FOR A CAREER | 5:48 PM | 16 KB |
| ☐ | • | VISTA PRINT | BUSINESS CARDS | 5:08 PM | 54 KB |
| ☐ | • | CONFIRMATION REQUIRED | LAPTOP NOTIFICATION | MON, 6/29/09 | 23 KB |
| ☐ | • | HAPPINESS | LOVING RELATIONSHIP | MON, 6/29/09 | 16 KB |
| ☐ | • | RESEARCH | NOTIFICATION | MON, 6/29/09 | 4 KB |
| ☐ | • | BLOG | NEW ENTRY | SAT, 6/27/09 | 3 KB |

CHECK ALL - CLEAR ALL
DELETE | SPAM | MARK ▽ | MOVE... ▽

CHAT & MOBILE TEXT
I AM OFFLINE ▽

▽ MY FOLDERS
☐ AAA (292)
☐ BBB

SYSTEM AND METHOD FOR DISPLAYING STATUS OF ELECTRONIC MESSAGES

TECHNICAL FIELD

The present disclosure generally relates to displaying electronic messages.

BACKGROUND

The advent of the internet has led to the growth of electronic messaging. It provides a convenient and fast way of transmission of digital messages. There are a host of online applications that make use of electronic messages such as, but not limited to, blogs, social networking websites, email systems and the like. Many electronic messaging systems are based on a store-and-forward model in which e-mail computer server systems accept, forward, deliver and store messages on behalf of users. The users may need to connect to the electronic messaging infrastructure, typically a messaging server, only for the duration of message submission or retrieval using a network-enabled device (e.g., a personal computer).

It is very common to have many unread messages in an inbox of the user's account. When the user logs in to his account, he may get a summary of all his unread messages even if he intends to see only the new messages. Thus, the user may need to browse further as he does not know whether he has received any new messages. Moreover, if the user has created folders in his account, for retrieval of electronic messages, he may have to go through each folder to check for new messages. Furthermore, when the user is using costly bandwidth, for example on a mobile or while traveling, he cannot directly see only the new messages he has received, instead he may be shown both new as well as the old unread mails. These circumstances lead to a waste of resources particularly time and money.

SUMMARY

In particular embodiments, the present invention provides methods, systems and computer program products for distinctly displaying one or more electronic messages on a user interface. In one method, the method records timestamps of one or more events in a first user session. These events may include, but not limited to, implicit or explicit ending of the first user session and/or last activity of the user in the first user session. Further, the method compares the timestamp of an initialization of a second user session, with one or more of the recorded timestamps. The second user session is subsequent to the first user session. Further, the method may mark one or more new electronic messages based on the comparison of the timestamps. The comparison of the timestamps may allow an electronic message system to mark or flag the electronic messages received after events such as, but not limited to, the last logout timestamp and/or the last activity timestamp. The method may then display the status of the one or more marked electronic messages on the user interface. The display may include a text link on the user interface that may indicate the count of the new electronic messages received after the events such as, but not limited to, last logout and/or last activity.

BRIEF DESCRIPTION OF THE DRAWINGS

FIG. 3A and FIG. 3B provide an example interface for displaying status of the one or more electronic messages, in an example embodiment of the invention;

DETAILED DESCRIPTION

Various embodiments of the present invention will be described in detail below with reference to accompanying drawings. It will be apparent, however, that these embodiments may be practiced without some or all of these specific details. In other instances, well known process steps or elements have not been described in detail in order not to unnecessarily obscure the description of the invention. The following example embodiments and their aspects are described and illustrated in conjunction with apparatuses, methods, and systems which are meant to be illustrative examples, not limiting in scope.

Example Network Environment

Figure 1:
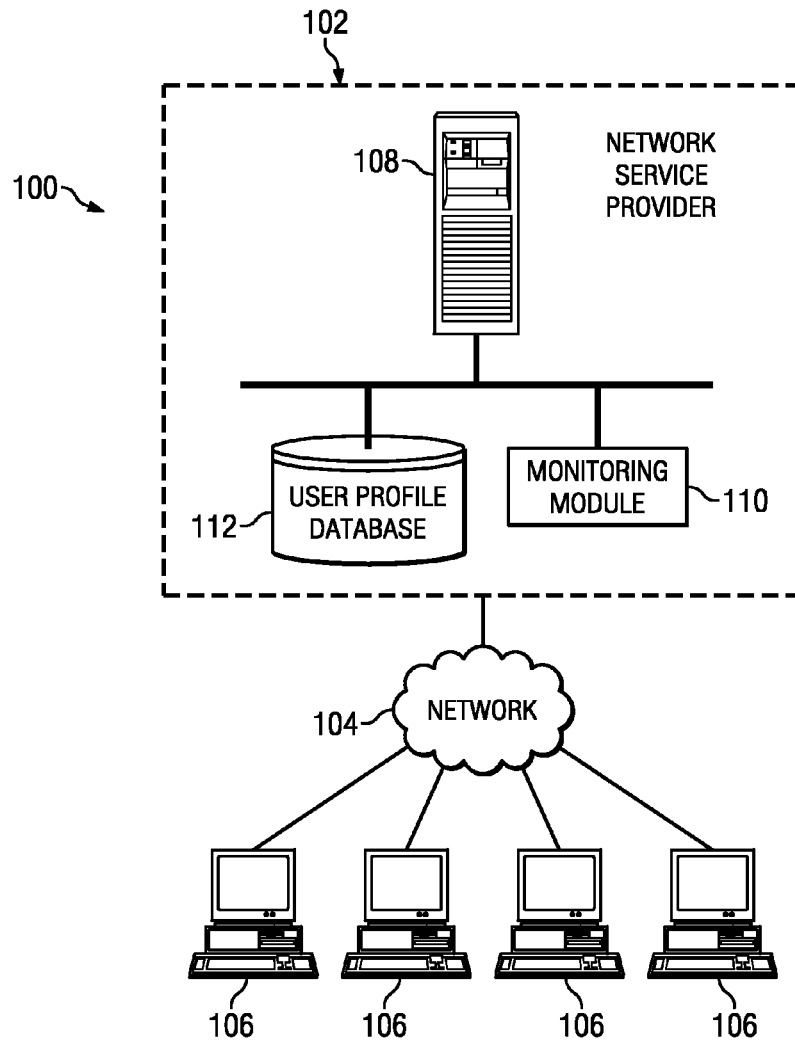
FIG. 1 illustrates an example of a network environment in which particular implementation of the invention may operate.

FIG. 1 illustrates an implementation of a network environment 100 in which various implementations of the invention may be deployed, according to one embodiment. Network environment 100 includes a network-based service provider 102, a network 104, and one or more client nodes 106. Network 104 generally represents one or more interconnected networks, over which network-based service provider 102 and client nodes 106 can communicate with each other. Network 104 may include packet-based wide area networks (such as the Internet), local area networks (LAN), private networks, wireless networks, satellite networks, cellular networks, paging networks, and the like. A person skilled in the art will recognize that network 104 may also be a combination of more than one type of network. For example, network 104 may be a combination of a LAN and the Internet. In addition, network 104 may be implemented as a wired network, or a wireless network or a combination thereof. Client nodes 106 and the PDAs or mobile devices are communicatively coupled to network-based service provider 102 via network 104.

Client Nodes

Client nodes 106 are computing devices from which a user accesses the services provided by network-based service provider 102. Client nodes 106 have the capability to communicate over network 104. Client nodes 106 further have the capability to provide the user an interface to interact with the services provided by network-based service provider 102. Client nodes 106 may be, for example, a desktop computer, a laptop computer, a mobile phone, a personal digital assistant, and the like. Client nodes 106 may execute one or more client applications such as, without limitation, a web browser to access and view content over a computer network, an email client to send and retrieve emails and an instant messaging client for communicating with other users, as well as other online service providers that may make use of the receipt and delivery of electronic messages. Client nodes 106 may be responsible for, but not limited to, sending and/or receiving the electronic messages to/from network-based service provider 102. Client nodes 106, in various embodiments, may include a Wireless Application Protocol (WAP) browser or other wireless or mobile device protocol suites such as, without limitation, Nippon Telegraph and Telephone (NTT)

DoCoMo's i-mode wireless network service protocol suites, Enhanced Data rates for GSM Evolution (EDGE), and the like.

Network-based Service Provider

Network-based service provider 102 is a network addressable system that further includes an application server 108, a monitoring module 110 and a user profile database 112. Application server 108 provides access to one or more client nodes 106 via network 104. Application server 108 primarily supports, at least but not limited to, accepting, storing, forwarding and delivering of electronic messages. In an embodiment, application server 108 may include a registration and authentication server (not included in FIG. 1), which facilitates the registration of new users, and authenticates existing users via a sign-in process. Further, the registration and authentication server uses security protocols such as, but not limited to, Secure Sockets Layer (SSL), Transport Layer Security (TSL) or GnuTLS.

Application server 108 may host the entire website architecture including, without limitation, webpage and applications implemented using Common Gateway Interface script (CGI), PHP Hyper-text Processor (PHP), Active Server Pages (ASP), Hyper Text Markup Language (HTML), Extensible Markup Language (XML), Asynchronous JavaScript (AJAX), Really Simple Syndication (RSS), Java and the like.

Further, application server 108 may host applications that may include, without limitation, an email service, a social or a business network, a blog service, an online forum, a Wiki service, a content distribution service or any other network application where the user is notified about activities, events, news, updates and/or any other action performed either by the user himself or any other user or system in the form of electronic messages.

Moreover, application server 108 may host, without limitation, any other application, which may deal with the sending and/or receiving of electronic messages to one or more intended recipients, as well as posting and viewing of electronic messages by the user. Examples of such network applications, where the usage of electronic messages are essential to notify the user may include, without limitation, Flickr™, Answers™, Orkut™, Yahoo! Mail©, etc.

In various embodiments of the present invention, the user may send and/or receive a variety of electronic messages which includes, without limitation, multimedia messages, audio messages, visual messages, text messages, and the like. Further, the electronic messages may include, but not limited to, emails, text messages, updates, notifications, news, alerts, instant messages, and the like.

Additionally, in one embodiment, application server 108 may use a store and forward model, wherein the electronic messages are accepted by application server 108 and stored until accessed by the user. These messages may be made available to the user on each subsequent session initialization.

User Profile Database

User profile database 112 may store information about all the users registered with network-based service provider 102. User profile database 112 may be implemented using any known database solution such as a Relational Database Management System (RDBMS), an Extensible Markup Language (XML) database, a flat file database, and the like. User profile database 112 is used to store user profile data, account details, other user information, electronic messages sent and/or received by the user and one or more recorded timestamp and the like. The user information may be provided by the user at the time of account creation and may also be updated later. The electronic messages stored in user profile database 112 may include, but is not limited to, all those electronic messages that are sent by the electronic message system during a first user session, and also those electronic messages that may be received by the electronic message system during the first user session and/or before an initialization of a second user session, such that the second user session is subsequent to the first user session.

When the user initializes the second user session, the user may be allowed to access the electronic messages in his/her account. These electronic messages may include, but are not limited to, certain unread electronic messages; certain read electronic messages, and/or new electronic messages that have been received in the account of the user during the first user session and/or second user session and/or period between the first and second user session.

Network-based service provider 102 further includes monitoring module 110. Monitoring module 110 may record the timestamp of one or more events of the user in the first user session, such as a login or access and/or logout, a last activity. Further, monitoring module 110 may compare the timestamp of an initialization of the second user session with one or more recorded timestamps. Further, monitoring module 110 may mark the one or more new electronic messages based on the comparison of the timestamps and display, on a user interface, a status of the one or more new electronic messages based on the markings applied to the one or more new electronic messages.

Monitoring Module

Figure 2:
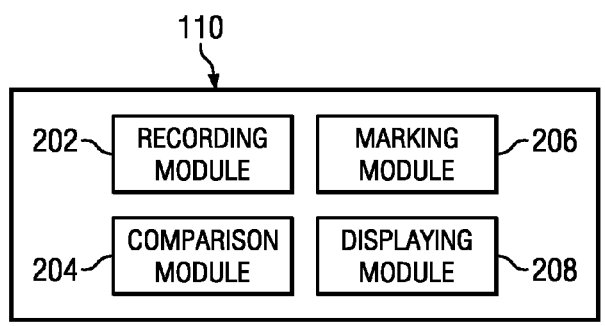
FIG. 2 is a block diagram of monitoring module in an example embodiment of the present invention.

FIG. 2 is a simplified block diagram of monitoring module 110 in accordance with one embodiment of the present invention. As shown in the FIG. 2, monitoring module 110 may include a recording module 202, a comparison module 204, a marking module 206 and a displaying module 208.

In one embodiment of the present invention, recording module 202 may record timestamps of one or more events of the first user session. The timestamp is a sequence of characters that may denote the date and/or time at which a certain event occurred. Timestamps may be recorded and maintained in a consistent and pre-defined format, allowing for, but not limited to, easy comparison of the one or more different timestamps and/or tracking progress overtime. Moreover, timestamps may be used for, but not limited to, event logging purposes.

In an embodiment of the present invention, the timestamp may uniquely identify the occurrence of one or more user events that may occur at a given instant of time. The timestamp may be used to log one or more user events such as, but not limited to, login and/or logout, last activity in the first user session, other activities in the first user session, implicit or explicit ending of the first user session, second user session initialization, and the like.

The first user session initialization may include, but is not limited to, the request sent from client nodes 106 of the user to application server 108 to initialize the user session. In one embodiment, the one or more events in the first user session may include, but not limited to, any action performed by the user during the first user session such as accessing, sending and/or receiving electronic messages, accessing one or more folders, updating the user profile, and the like. Additionally, the one or more events may further include those cases when the user remains signed in and closes the browser window, in which the first user session is in progress. The timestamp of the last such event may be referred to as the last activity timestamp. In an embodiment, the timestamps for the one or more events of the first user session may be recorded periodically.

Further, in an embodiment, the one or more events may also include, ending of the first user session either explicitly or implicitly. The explicit ending of the first user session may be done by the user by means of the options provided to the user such as, but not limited to, 'sign out' or 'log out' and the like. The implicit ending may occur when the first user session expires from a server end or due to any other reason out of the user's control. The timestamp of the ending of the first user session, either due to explicit or implicit reasons may be referred to as a last logout timestamp.

In an embodiment of the present invention, the recorded timestamps for the one or more events may be stored in user profile database 112. Further, the timestamps may also be stored in any data store such as, but not limited to, a file system implemented on application server 108. In another embodiment of the present invention, the timestamps may be stored on client nodes 106 of the user. Client nodes 106 may store this information in, but not limited to, a browser cookie, or any other data structure that may be cached at client nodes 106. The timestamp information may be transferred to application server 108 on or before the initialization of the second user session, where the second user session is initialized after the implicit or explicit end of the first user session.

In an embodiment of the present invention, when the user requests for an initialization of the second user session, after the first user session expires or ends, comparing module 204 may compare the timestamp of the initialization of the second user session with the recorded timestamps of one or more events of the first user session. In an embodiment of the present invention, comparing module 204 may compare the timestamp of the initialization of the second user session with the recorded timestamps of one or more events such as, but not limited to, last activity timestamp and/or last logout timestamp. In an embodiment of the present invention, if the timestamps are stored in the form of cookies in client nodes 106 of the user, the timestamps will be provided to comparison module 204, at the time of initialization of the second user session, for comparing it with the recorded timestamps. In another embodiment of the present invention, comparison module 204 may retrieve the recorded timestamps from user profile database 112. The comparison of the timestamps may facilitate the identification of a time interval during which the user may have received one or more new electronic messages.

Further, every electronic message received by the user may also have a timestamp associated with it, which denotes the time at which the electronic messages have been received by an electronic message system. Marking module 206 may receive the timestamps associated with the electronic messages from user profile database 112. The one or more electronic messages received by the user during the identified time interval may be identified as new electronic messages. Further, marking module 206 may mark the new electronic messages based on the comparison of the timestamps, received from comparison module 204. Thus, marking module 206 may suitably identify the new electronic messages that may have been received after the one or more events such as, but not limited to, last logout and/or last activity of the user in the first user session. In an embodiment, the marked new electronic messages may be associated with one or more user defined and/or default folders.

In one embodiment of the present invention, displaying module 208 may display the status of one or more new electronic messages on a suitable user interface on the establishment of the second user session, based on the markings applied to the one or more new electronic messages. In an embodiment of the present invention, the status may include indicating on the user interface one or more suitable notifications to the user, but not limited to, the count of the marked new electronic messages since an event corresponding to the first user session. In an embodiment of the present invention, displaying module 208 may provide a text on the user interface which provides a notification of the count of the new electronic messages received by the user after the last logout and/or after the last activity. For example, the text may include, but not limited to, "the messages received after last logout are 10" and/or "the messages received after the last activity are 6".

Further, in an embodiment of the present invention, the text may be hyperlinked to one or more pages that facilitate the display of the content of the one or more marked new electronic messages received by the user. In an embodiment of the present invention, the user may be able to view all the new electronic messages associated with each of the user defined or default folder in a single webpage on the user interface. In another embodiment of the present invention, displaying module 208 may display the marked new electronic messages separately in separate web-pages corresponding to their user defined folders or default folders.

Further, in an embodiment of the present invention, the marked new electronic messages received by the user may be displayed according to one or more user-defined criteria. For example, certain new electronic messages received from a particular sender may be marked in a specific user-defined color.

Further, in another embodiment of the present invention, if the user wants to access the electronic messages through cell-phone or any other mobile device, such as, but not limited to, PDA, then the user may be allowed to separately view the count of the marked new electronic messages received and/or the contents of the marked new electronic messages received. This may allow the user to save on bandwidth as opposed to allowing the user to access all the electronic messages received by the user.

Figure 3A:
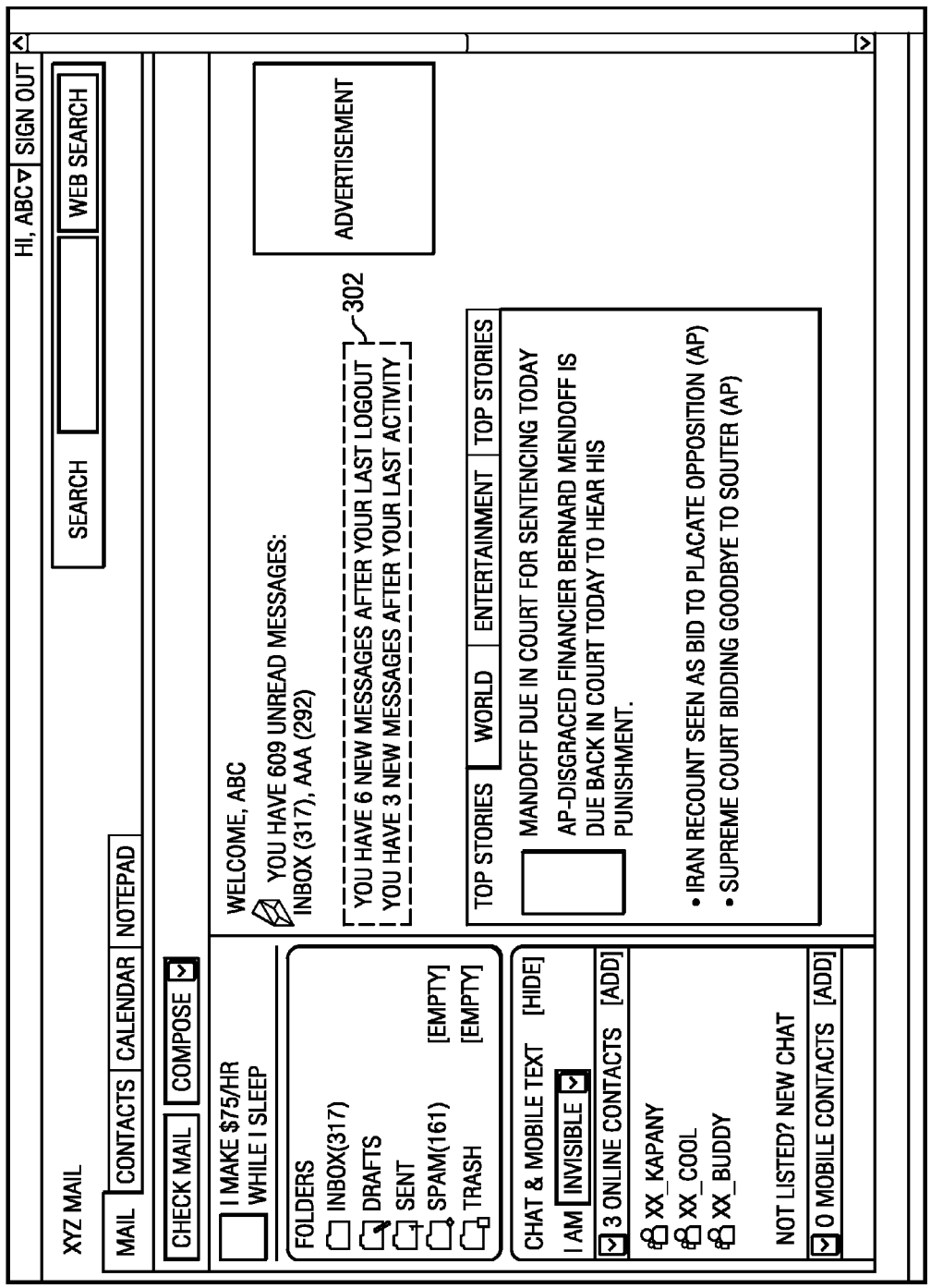

FIG. 3A illustrates an example user interface 300, in accordance with an embodiment of the invention. In this example embodiment, the user may need to create a personal account with network-based service provider 102 in order to access the one or more electronic messages sent to his account. The electronic messages may include a variety of electronic mails that include but not limited to, scanned images, text mails, sound clips, video recordings etc. Further, the electronic messages may be associated with one of the user defined and/or default folders. The electronic messages may be stored in user profile database 112 and may be retrieved when the user signs in to his account.

In the example embodiment, recording module 202 may record the timestamps of the one or more events of the user in the first user session. The recorded timestamps may also include the last logout timestamp and/or the last activity timestamp.

Further, after the end or expiry of the first user session, when the user sends a request for an initialization of the second user session, comparing module 204 may compare the timestamp of the initialization of the second user session and the recorded timestamps of one or more events such as, but not limited to, last logout timestamp and/or the last activity timestamp. Subsequently, marking module 206 may suitably mark the new electronic messages based on the comparison of timestamps. In other words, any messages bearing timestamps later than the recorded last logout timestamp and/or the last activity timestamp are appropriately marked in either or both categories.

In an example embodiment of the present invention, displaying module 208 may display, on the user interface, the status of the one or more new electronic messages based on the markings applied to the one or more new electronic messages received. User interface 300 may depict, but not limited to, other account related information such as, but not limited to, the folders present in the user's account, chat windows, other general functionalities such as web search and/or advertisements. The user may directly access user interface 300, or may be re-directed to the same.

In the example embodiment, user interface 300 may contain text 302 that suitably indicates the count of the new electronic messages received after the last activity and/or last logout. For example, as shown in this example embodiment, the user is informed that he has received 6 new e-mails after his last logout and 3 new e-mails after his last activity. A person ordinarily skilled in the art may recognize that the numerical values stated in the example embodiment are for illustrative purposes only and does not limit the scope of the invention.

Further, text 302 in user interface 300 may be hyperlinked to one or more web-pages, as illustrated in FIG. 3B, that may display the listing of the marked new electronic messages received by the user.

In this example embodiment, the display of the marked new electronic messages may include messages received by the user associated with one or more default and/or user defined folders in one location. The web-page may indicate the sender of the marked new electronic messages, the subject, and the date of receipt as well as size of the electronic message. Further, the user is provided the option of, but not limited to, designating the marked new electronic messages received as spam, moving the marked new messages to one or more folders, marking the messages as 'read' and/or deleting the messages. User interface 300 may also contain other information such as, but not limited to, advertisements, search tabs and messenger windows or links to any other online service or application. The user may be allowed to view the content of the marked new messages by suitably clicking on the desired message.

Process

Figure 4:
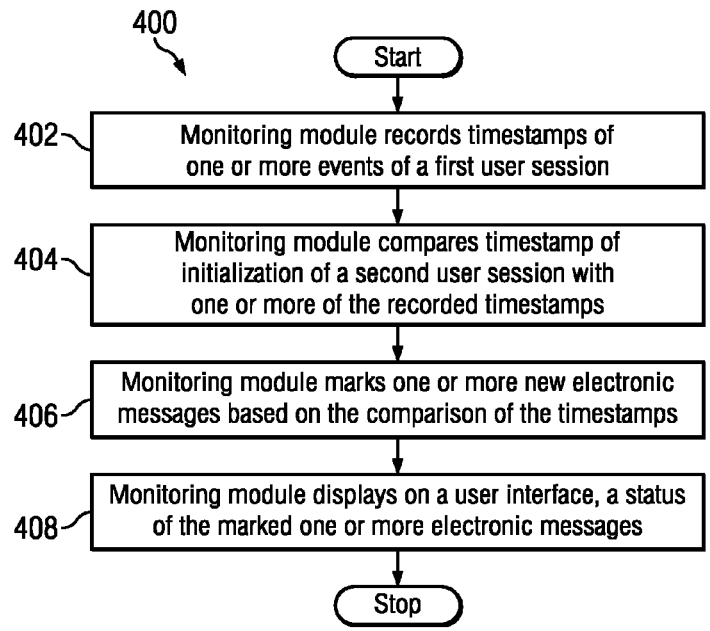
FIG. 4 is a flowchart illustrating an example method for displaying status of the one or more electronic messages.

FIG. 4 is a flowchart illustrating an example process 400 for displaying one or more new electronic messages on the user interface.

At step 402, recording module 202 may record timestamps of one or more events of the user in the first user session. The timestamp is a sequence of characters that may denote the date and/or time at which a certain event occurred. In an embodiment of the present invention, the timestamp may uniquely identify the occurrence of one or more user events that may occur at a given instant of time. The timestamp may be used to log one or more user events such as, but not limited to, login and/or logout, other activities in the first user session, implicit or explicit ending of the first user session, second user session initialization, and the like.

The one or more events that occur during the first user session, referred to as user activities, may include the cases when the user remains signed in and close the browser window, in which the first user session is in progress. The timestamp of the last such activity may be referred to as the last activity timestamp. In an embodiment, the timestamps for the one or more events of the first user session may be recorded periodically. Further, in an embodiment, the one or more events may also include, ending of the first user session either explicitly or implicitly. The timestamp of the ending of the first user session, either due to explicit or implicit reasons may be referred to as last logout timestamp.

At step 404, comparing module 204 may compare the timestamp of the initialization of a second user session with the recorded timestamps of one or more events of the first user session, such that the second user session is subsequent to the first user session. In an embodiment of the present invention, comparing module 204 may compare the timestamp of the initialization of the second user session with the recorded last activity timestamp and/or last logout timestamp.

At step 406, marking module 206 may mark the new electronic messages based on the comparison of the timestamps performed by comparison module 204. Thus, marking module 206 may suitably identify the new electronic messages that may have been received after the ending of the first user session and/or last activity of the user in the first user session. In an embodiment, the marked new electronic messages may be associated with one or more user defined and/or default folders.

At step 408, displaying module 208 may display the status of the one or more marked new electronic messages on a suitable user interface on the establishment of the second user session. In an embodiment of the present invention, displaying module 208 may provide a text on the user interface which indicates at least a count of the new electronic messages received since an event corresponding to the first user session. In various embodiments of the invention, the event may include, but not limited to, last logout and/or last activity in the first user session.

Further, in an embodiment of the present invention, the text may be hyperlinked to one or more web-pages that facilitate the display of the content of the one or more marked new electronic messages received by the user.

Message Monitoring Architecture

Figure 5:
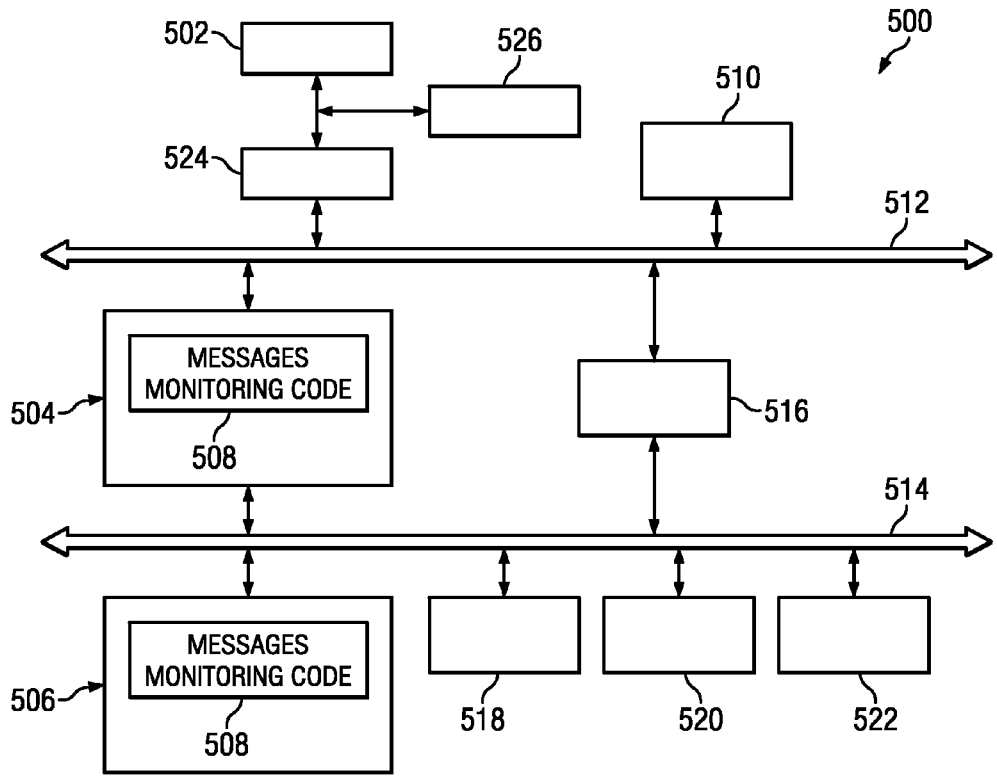
FIG. 5 is a schematic diagram illustrating an example computing system for displaying status of the one or more new electronic messages according to one embodiment.

FIG. 5 illustrates an example hardware system 500 to implement electronic messaging monitoring system 110 according to one embodiment. Hardware system 500 includes at least one processor 502, a system memory 504, and mass storage 506. The system memory 504 has stored therein one or more application software, message monitoring code 508 for implementing messaging monitoring system 110, an operating system and drivers directed to the functions described herein. Mass storage 506 provides permanent storage for the data and message monitoring code 508 for messaging monitoring system 110, whereas system memory 504 (e.g., DRAM) provides temporary storage for the data and programming instructions when executed by processor 502. The process flow of the message monitoring code 508 for messaging monitoring system 110 is described in detail in conjunction with FIG. 4. In one embodiment, user profile database 112 may reside in mass storage 506. A network/communication interface 510 provides communication between hardware system 500 and any of a wide range of networks, such as an Ethernet (e.g., IEEE 802.3) network, etc. Additionally, hardware system 500 includes a high performance input/output (I/O) bus 512 and a standard I/O bus 514. System memory 504 and network/communication interface 510 are coupled to bus 512. Mass storage 506 is coupled to bus 514. I/O Bus Bridge 516 couples the two buses 512 and 514 to each other.

In one embodiment, process 400 described herein are implemented as a series of software routines run by hardware system 500. These software routines comprise a plurality or series of instructions to be executed by a processor in a hardware system, such as processor 502. Initially, the series of instructions are stored on a storage device, such as mass storage 506. However, the series of instructions can be stored on any suitable storage medium, such as a diskette, CD-ROM, ROM, EEPROM, DVD, Blu-ray disk, etc. Furthermore, the series of instructions need not be stored locally, and could be received from a remote storage device, such as server on a network, via network/communication interface 510. The instructions are copied from the storage device, such as mass storage 506, into system memory 504 and then accessed and executed by processor 502.

In one embodiment, hardware system 500 may also include I/O ports 518, a keyboard and pointing device 520, a display 522 coupled to bus 512. I/O ports 518 are one or more serial and/or parallel communication ports that provide communication between additional peripheral devices, which may be coupled to hardware system 500. A host bridge 524 couples processor 502 to high performance I/O interface 510. Hardware system 500 may further include video memory (not shown) and a display device coupled to the video memory. Collectively, these elements are intended to represent a broad category of computer hardware systems, including but not limited to general purpose computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

Hardware system 500 may include a variety of system architectures; and various components of hardware system 500 may be rearranged. For example, cache 526 may be on-chip with processor 502. Alternatively, cache 526 and processor 502 may be packed together as a "processor module," with processor 502 being referred to as the "processor core. "Furthermore, certain embodiments of the present invention may not require nor include all of the above components. For example, the peripheral devices shown coupled to standard I/O bus 512 may couple to high performance I/O interface 510. In addition, in some embodiments only a single bus may exist with the components of hardware system 500 being coupled to the single bus. Furthermore, hardware system 500 may include additional components, such as additional processors, storage devices, or memories.

An operating system manages and controls the operation of hardware system 500, including the input and output of data to and from software applications (not shown). The operating system provides an interface between the software applications being executed on the system and the hardware components of the system. According to one embodiment of the present invention, the operating system is the LINUX operating system. However, the present invention may be used with other suitable operating systems, such as the Windows® 95/98/NT/XP/Server operating system, available from Microsoft Corporation of Redmond, Wash., the Apple Macintosh Operating System, available from Apple Computer Int. of Cupertino, Calif., UNIX operating systems, and the like.

The present invention has been explained with reference to specific embodiments. For example, while embodiments of the present invention have been described with reference to specific hardware and software components, those skilled in the art will appreciate that different combinations of hardware and/or software components may also be used, and that particular operations described as being implemented in hardware might also be implemented in software or vice versa. Other embodiments will be evident to those of ordinary skill in the art. It is therefore not intended that the present invention be limited, except as indicated by the appended claims.

The invention claimed is:

1. A method comprising:
recording timestamps of one or more events of a first user session associated with a user;
logging at least one timestamp for an initialization of a second user session associated with the user;
comparing a timestamp of an initialization of a second user session with one or more of the recorded timestamps, wherein the second user session is ongoing and subsequent to the first user session;
marking one or more new electronic messages received based on the comparison of the timestamps, wherein the marked one or more new electronic messages include each message that is received after a last activity of the user during the first user session and before the initialization of the second user session; and
displaying, on a user interface of the user, a status of the one or more new electronic messages based on the markings applied to the one or more new electronic messages.

2. The method of claim 1, wherein displaying on the user interface comprises providing a text on the user interface to indicate at least a count of the one or more new electronic messages received since an event corresponding to the first user session.

3. The method of claim 2, wherein the text is hyperlinked to display the new electronic messages on the user interface.

4. The method of claim 1, wherein the one or more events include at least one of an implicit or explicit end of the first user session.

5. The method of claim 1, wherein displaying on the user interface further comprises providing text on the user interface to indicate at least a count of the one or more new electronic messages received after the last activity of the user during the first user session.

6. The method of claim 1, wherein the recorded timestamps of one or more events are stored on a server.

7. The method of claim 1, wherein the recorded timestamps of one or more events are stored on a client node of the user.

8. The method of claim 1, wherein the marked new electronic messages are displayed based on one or more user identified criteria.

9. The method of claim 1, wherein the marked new electronic messages are associated with at least one of one or more user defined or defaulted folders.

10. The method of claim 1, wherein the marked new electronic messages are displayed on one or more pages of the user interface.

11. A system comprising:
one or more network interfaces;
at least one processor;
a memory storing a computer program code,
wherein the computer program code, when executed by the at least one processor, is operative to cause the at least one processor to:
record timestamps of one or more events of a first user session associated with a user;
log at least one time stamp for an initialization of a second user session associated with the user;
compare a timestamp of an initialization of a second user session with one or more of the recorded timestamps, wherein the second user session is ongoing and subsequent to the fist user session;
mark one or more new electronic messages received based on the comparison of the timestamps, wherein the marked one or more new electronic messages include each message that is received after a last activity of the user during the first user session and before the initialization of the second user session; and
display, on a user interface of the user, a status of the one or more new electronic messages based on the markings applied to the one or more new electronic messages.

12. The system of claim 11, wherein the computer program code is further operative to cause the at least one processor to provide a text on the user interface to indicate at least a count of the one or more new electronic messages received since an event corresponding to the first user session.

13. The system of claim 12, comprising a monitoring module which comprises said at least one processor and the memory storing the computer program code.

14. The system of claim 12, wherein the text is hyperlinked to display the new electronic messages on the user interface.

15. The system of claim 11, wherein the one or more user events include at least one of an implicit or explicit end of the first user session.

16. the system of claim 11, wherein displaying on the user interface further comprises providing a text on the user interface to indicate at least a count of the one or more new electronic messages received after the last activity of the user during the first user session.

17. A computer program product comprising a non-transitory computer readable medium encoded with computer-executable instructions for targeting users for content provision, the computer-executable instructions, when executed by the one or more processors, cause one or more processors to:

record timestamps of one or more events of a first user session associated with a user;

log at least one time stamp for an initialization of a second user session associated with the user;

compare a timestamp of an initialization of a second user session with one or more of the recorded timestamps, wherein the second user session is ongoing and subsequent to the first user session;

mark one or more new electronic messages received based on the comparison of the timestamps, wherein the marked one or more new electronic messages include each message that is received after a last activity of the user during the first user session and before the initialization of the second user session; and display, on a user interface of the user, a status of the one or more new electronic messages based on the markings applied to the one or more new electronic messages.

18. The computer program product of claim 17, further comprising computer-executable instructions operable to cause the one or more processors to provide a text on the user interface to indicate at least a count of the one or more new electronic messages received since an event corresponding to the first user session.

19. The computer program product of claim 18, wherein the text is hyperlinked to display the new electronic messages on the user interface.

\* \* \* \* \*